UNITED STATES PATENT OFFICE.

HEINRICH UJHELY AND CHRISTIAN BEURLE, OF VIENNA, AUSTRIA.

IMPROVEMENT IN TREATING BITUMINOUS MATERIALS FOR THE MANUFACTURE OF CERASINE OR WAX.

Specification forming part of Letters Patent No. 131,137, dated September 3, 1872.

*To all whom it may concern:*

Be it known that we, HEINRICH UJHELY and CHRISTIAN BEURLE, of Vienna, Austria, did invent a new and useful Improvement in the Manufacture of Cerasine; and we do hereby declare the following to be a full, clear, and exact description thereof, which will enable those skilled in the art to make and use the same.

This invention relates to a product which we call "Cerasine," and which is obtained from ozocerite, asphaltum or bituminous tar, or resin, or mineral pitch, by subjecting the same to a process substantially such as hereinafter described.

In carrying out our invention we heat one hundred parts of ozocerite or corresponding quantities (according to quality) of asphaltum or bituminous tar, (Rangoon tar,) or resin, or mineral pitch to 150° Celsius, and after the essential oils, mixed with the ozocerite or equivalent material, have been evaporated we allow the residuum to cool off to 60° Celsius. At this temperature we digest the residuum with about sixteen per cent. of smoking sulphuric acid until the mass becomes perfectly solid. The mixture thus obtained we again heat to 160° Celsius, whereby a separation is effected, one portion forming a sediment containing coagulated asphaltum, while the supernatant liquid contains the valuable wax or "cerasine." This liquid is carefully poured off and then heated, and, while boiling, digested with twenty per cent. of pulverized bone-black, and after the lapse of about an hour a product is obtained, which we wrap up in unglued paper and then in a cloth of linen, cotton, or other fibrous material, and put it between heated plates and expose it to powerful pressure. By this process we obtain a product which resembles very closely the yellow bees-wax. The bone-black adheres to the cloth and is separated from the wax. The yellow wax-like product is then heated to 120° Celsius and mixed up with ten per cent. of pulverized bone-black, and then passed through white unglued paper and a filter heated by steam, and the result is a white wax-like product, which we call cerasine.

By employing raw material of good quality the process may be shortened; but when inferior raw materials are used higher degrees of heat are required, and the filtering process must be repeated several times in order to obtain the desired result.

What we claim as new, and desired to secured by Letters Patent, is—

1. A product which we term "cerasine," and which is obtained by treating ozocerite, asphaltum, mineral pitch, or other equivalent materials, substantially in the manner herein shown and described.

2. The within-described process of treating ozocerite, asphaltum, mineral pitch, or other equivalent materials for the purpose of producing what we term "cerasine."

Vienna, 29th May, 1872.

HEINRICH UJHELY. [L. S.]
  CHRISTIAN BEURLE. [L. S.]

In presence of—
 G. TOS. WINIWATER,
 CARL SCHMIDT.